Dec. 31, 1968     H. E. TRACY     3,419,279
MECHANICAL SEALS

Filed Feb. 9, 1967     Sheet 1 of 2

HERBERT E. TRACY
INVENTOR.

BY C. G. Stallings

ATTORNEY

United States Patent Office 3,419,279
Patented Dec. 31, 1968

3,419,279
MECHANICAL SEALS
Herbert E. Tracy, Alhambra, Calif., assignor to Borg-Warner Corporation, Chicago, Ill., a corporation of Illinois
Filed Feb. 9, 1967, Ser. No. 614,839
11 Claims. (Cl. 277—22)

ABSTRACT OF THE DISCLOSURE

As a cooling method and means for a mechanical seal for a hot water pump shaft, the provision of a bellows type seal, having its seal faces located in a chamber outside the pump stuffing box, through which chamber pump fluid reaches and lubricates the seal faces, and which chamber is formed primarily by the bellows, an insulated annular shaft sleeve having an opening to the chamber, and a seal face. The bellows acts as a heat dissipating cooler element.

A stationary air scoop creates air turbulence directed against the outside of the bellows to promote heat dissipation.

---

This invention relates to the provision of an improved cooling means for a bellows type mechanical seal for a pressure vessel such as a hot water pump, wherein the liquid being pumped serves to lubricate the seal faces.

The following description will be to the seal and its application to a rotating shaft of a hot water pump, for illustrative purposes.

More particularly, the invention makes use of a welded metal bellows as the equivalent of a fin type cooler, for dissipating heat in the small amount of fluid from a pump stuffing box used for lubricating and cooling the relatively rotating faces of a mechanical seal, and the arrangement contemplates a method and means of insulating the seal faces from the stuffing box, conducting the cooling fluid through a heat dissipating chamber located outside the stuffing box, and preferably in the atmosphere.

Heretofore, the use of mechanical seals for hot water pumps and the like has been faced with difficulties, for the reason that excessive temperatures at the sealing faces have tended to destroy the lubricating fluid and thus harm such devices. Where hot pump liquid has been used to lubricate the seal faces, the heat has a tendency to vaporize the liquid, particularly when the friction heat at the seal face is imparted to the liquid. This has resulted in blocking or destroying the liquid film, with resultant deterioration of the seal face, and destruction of the seal. Previously, this problem has been attacked by the provision of a seal in which a lubricant other than the pump fluid is supplied to the seal faces, and frequently, use is made of a water jacket, heat exchanger, cold condensate, or other means to lower the temperature of the fluid serving as a seal lubricant. An example of this is the arrangement shown in the Reinhardt et al. Patent 2,354,478, dated July 25, 1944, which uses an induced separate lubricant. This particular Reinhardt seal must be used on a vertical shaft, or one substantially vertical, and has many obvious deficiencies for the purpose of applicant's invention.

It is an object of the present invention to provide a self-cooling seal in which use is made of the pump fluid for lubricating the seal faces, which seal is equally effective when disposed in any attitude, whether of vertical, horizontal, or other angular disposition.

It is a further object of the invention to provide an arrangement wherein a bellows type seal is mounted outside the stuffing box, but in liquid communication therewith, so that the bellows is exposed to atmosphere, and in which a shaft sleeve having insulating properties, is installed between the bellows and seal faces and the shaft, with the sleeve extending through the seal elements and bellows to a position approaching a bellows adaptor, thus providing a cooling chamber between the outer diameter of the sleeve and the inner surface of the bellows.

A liquid conduit is provided between the sleeve and the rotating shaft being sealed, with a fluid admitting opening into the chamber at or adjacent the end of the sleeve remote from the seal faces, whereby liquid will be conducted from the pump stuffing box through the space between the sleeve and the shaft, and discharged into the chamber at a position remote from the seal faces, which will result in its having to flow past the cooling bellows to reach and lubricate the seal faces.

It is the object to provide a seal of the bellows type, in which pump liquid lubricates the seal after such liquid has been cooled by dissipation of heat through the seal bellows and before it reaches the seal faces.

It is the further object of the present invention to provide a means of deflecting air to enhance the flow of air over the outer surface of the bellows for faster dissipation of heat.

Other objects and uses of the invention will be apparent from the following deescription of the structure, to which reference is made for the purpose of ascertaining the same.

Figure 1:
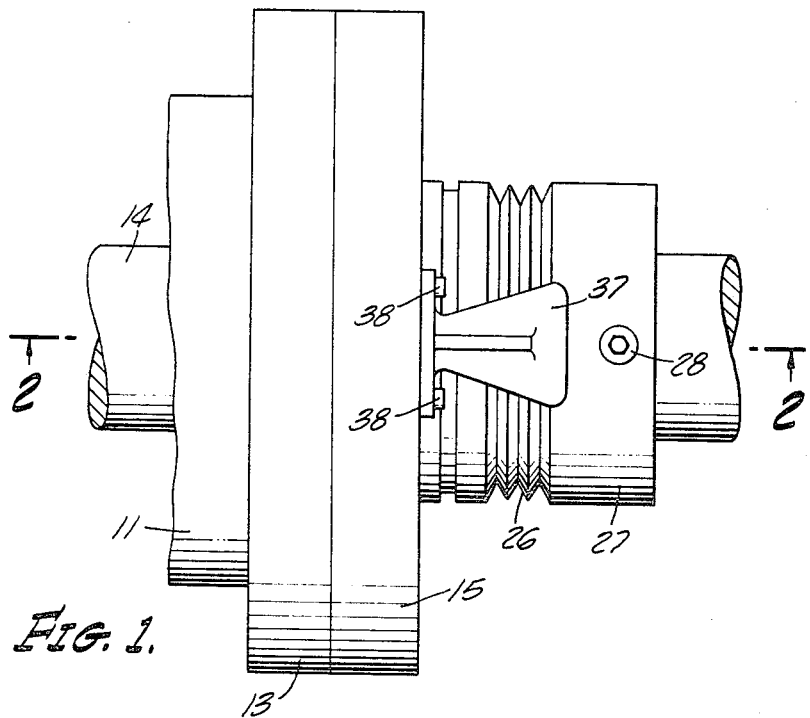
FIG. 1 is a top plan view illustrating the device of the present invention applied to a pump, the illustration of the pump and pump shaft being fragmentary.
Figure 2:
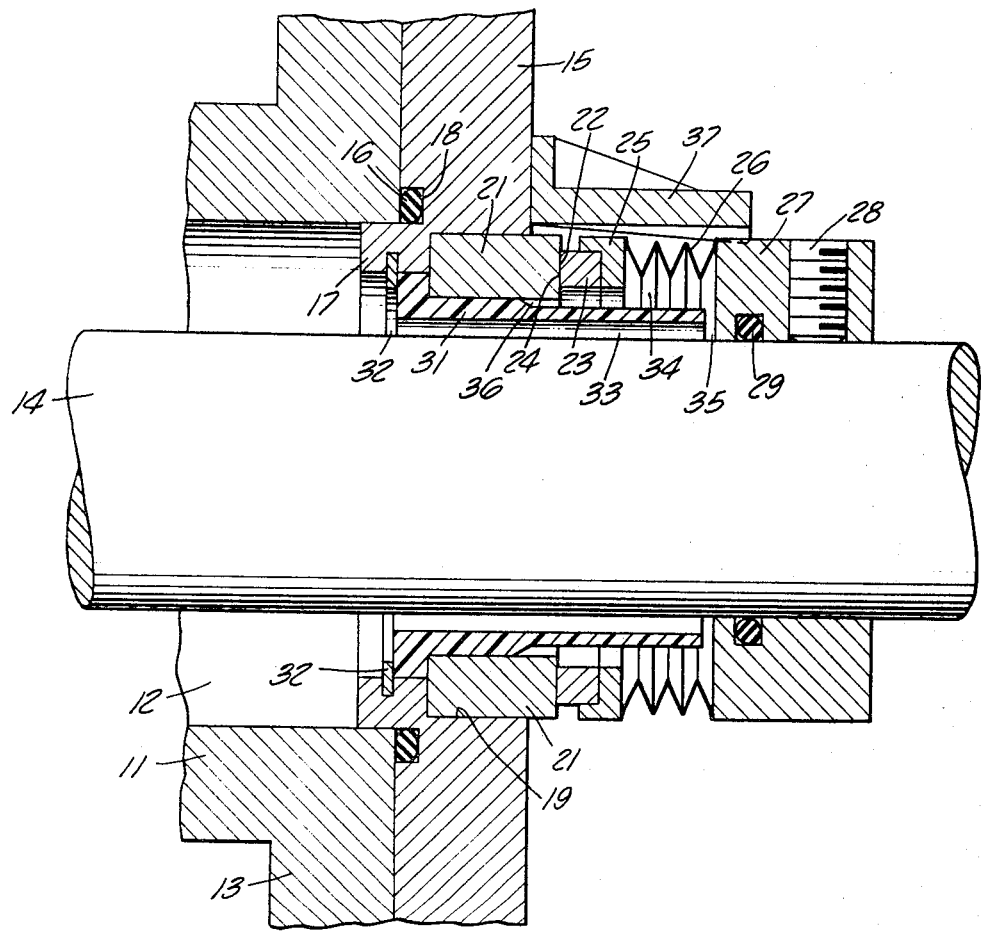
FIG. 2 is a cross-sectional view taken on the lines 2—2 of FIG. 1 looking in the direction indicated by the arrows.

Referring more in detail to the construction shown in the drawings, and referring first to FIGS. 1 and 2, there is here shown in fragmentary form a vessel, usually a pressure vessel, having a housing 11 (herein sometimes referred to as a pump housing) the interior of which comprises a stuffing box 12, which housing 11 terminates in the end flange 13. A rotatable shaft (herein sometimes called a pump shaft) 14, extends outwardly from the stuffing box through the end flange 13. This rotatable pump shaft is likewise shown in fragmentary form, since it is conventional.

Attached to the outer end wall of the end flange 13 is a seal flange 15, the attaching means not being illustrated, but conventional means such as bolts may be used for the purpose.

It is noted that in the construction shown, the seal flange 15 in turn has a reduced flange portion or spigot 17 which fits into the bore of the stuffing box, and an O-ring 16 or other suitable means is nestled in a groove 18 to make a leakproof joint between the end flange 13 and the seal flange 15.

The internal bore of the seal flange 15 is provided with an annular enlargement 19, of its inner diameter, into which is seated a non-rotatable seal ring 21. This seal ring 21 is preferably of a material having poor heat conductivity properties such as a ceramic, whereby any heat from the stuffing box reaching the side of the seal ring 21 nearest the stuffing box 12, is not conducted to the seal face 22 of said seal ring 21. The seal ring 21 may be retained against rotation in any convenient manner. It is preferable that seal ring 21 extends outwardly past the seal flange whereby a portion of the seal ring is exposed to atmosphere for additional cooling.

Located in axial alignment with the seal ring 21, and in juxtaposition therewith, is the rotatable seal ring 23, which has a seal face 24. The seal face 24 mates with the non-rotatable seal face 22, the elements 21 and 23 together comprising a ring seal.

The rotatable seal ring 23 may be made of any suitable material such as carbon, metal, or a suitable plastic. The seal ring 23 is mounted in and held in position by flanged ring 25, which in turn is attached to a bellows 26, of a material such as beryllium-copper or other material with high heat conductive properties.

In turn, the bellows 26 is welded or otherwise attached to an adaptor 27, drivingly connected to the shaft 14 by any convenient means, such as the set-screw 28. The adaptor 27 is grooved to receive an O-ring 29 to prevent escape axially along the shaft 14 of fluid from the pump. Rotation of the shaft 14 thus rotates the adaptor 27, bellows 26, flange ring 25, and seal ring 23, as a unit.

Fitted into the bore of the non-rotating seal ring 21, is a flanged sleeve 31, which sleeve is concentric with the shaft 14, the flange of which sleeve preferably extends radially outwardly into engagement with the seal flange 15, and thus, with the spigot 17 of the flange 15, lies between the seal ring 21 and the stuffing box 12, effectively interposing a heat barrier against the transfer of heat from the stuffing box to the seal 21.

The spigot 17 is preferably grooved in its annulus to receive the split retainer ring 32 against which the sleeve 31 is seated.

It is noted, that the sleeve 31 is concentric with the shaft 14, and is spaced therefrom to form a flow-path 33 for liquid to flow from the stuffing box into the area between the sleeve 31 and the shaft 14. Since this liquid flow will be very nominal, being an amount only equal to the liquid dissipated through the space between the seal ring faces 22 and 24, the spacing or opening between the sleeve 31 and the shaft 14, is preferably held to a minimum.

The sleeve 31, at least for high temperature seals, and as shown in FIG. 2, is preferably made of an insulating material, that is, a material having a low heat transfer coefficient, whereby entrapped heat in the fluid flowing between the sleeve 31 and the shaft 14, is prevented from being transferred through the sleeve into the seal area. A suitable insulating sleeve has been found to be one constructed of nylon, Teflon, or Zytel.

The sleeve 31 preferably extends outwardly axially along the shaft to a position closely adjacent to or abutting the adaptor 27, it being preferable that only sufficient space comprising an opening 35, exists between the end of the sleeve and the adaptor to allow an amount of fluid to flow past the sleeve equal to that dissipated across the seal faces. This increases the cooling efficiency of the seal, although the opening is not critical, nor is the passage between the sleeve and the shaft critical in size, other than that both the passage and the opening not restrict the flow to an amount less than that necessary for lubricating the seal faces 22 and 24, or that the passage and opening not be large enough to allow an excessive circulation of hot liquid to the seal faces.

It is thus noted, that in the arrangement illustrated, there is formed what may be termed a cooling chamber 34, wherein the sleeve 31 forms the inner wall of said chamber, and the bellows 26, flange ring 25, and the bores of seal 23 and seal 21, form the outer wall and one end wall of the enclosure of said chamber. The adaptor 27 forms the other end wall of said chamber. Fluid from the stuffing box is leaked along the flow-path 33, through the opening 35 and into the chamber 34 at the end thereof remote from the seal faces 22 and 24, that is, the adaptor end of the chamber 34.

In order to subject the non-rotatable seal ring 21 to the cooling effect of the fluid in the chamber 34 to the maximum extent, preferably the sleeve 31 is reduced in diameter to provide a space 36 between the outer end of the seal ring 21 and the sleeve 31, for a substantial distance inwardly from the seal face 22. Thus the space 36 for perhaps one-third the axial length of the seal ring 21, becomes a part of the chamber 34 and cooling fluid circulates beneath the outer end of the seal ring 21.

As shown in FIGS. 1 and 2, an air scoop 37 is shown affixed to the seal flange 15 by the cap screws 38, or any other convenient means. This air scoop 37 does not rotate, and has the effect of breaking up rotating currents of air set up by the rotation of the bellows 26, so that the air is deflected against the outer surface of the bellows 26 and removes a maximum of the heat therefrom, causing a very desirable cooling effect to assist the bellows 26 in dissipating heat from the chamber 34.

Figure 3:
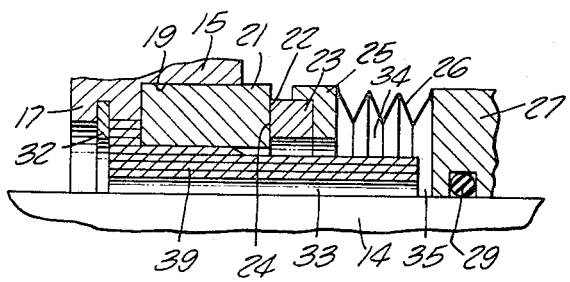
FIG. 3 is a fragmentary cross-sectional view illustrating a modified form of seal construction.

Referring to the arrangement of FIG. 3, there is here shown a modified form of insulating sleeve. In FIG. 3, a flange 15, spigot 17, non-rotatable seal ring 21, a rotatable seal ring 23, flange ring 25, bellows 26, adapter 27, and rotating shaft 14, are the same as or similar to those elements described in FIGS. 1 and 2. However, in FIG. 3 is now provided a sleeve 39 in place of the sleeve 31 of FIG. 2. The sleeve 39 may be described as a laminated sleeve, since it comprises a series of concentric sleeves, one within the other, which may be made of metal or any other suitable material. It is known that laminations inhibit the flow of heat, and advantage has been taken of this well-known phenomenon to provide a rugged sleeve with a low heat conducting ability; otherwise, the arrangement of FIG. 3 is comparable in all respects to the arrangement of FIG. 2.

Figure 4:
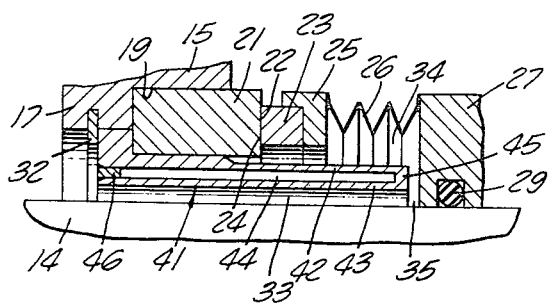
FIG. 4 is a view similar to that of FIG. 3, but illustrating still another modified form of construction.

Similarly, in FIG. 4 advantage has been taken of the fact, that a space which is either a vacuum or has air entrapped therein, is similary a poor heat conductor.

In FIG. 4 there is shown the sleeve 41 comprising two concentric sleeve portions 42 and 43, with space 44 therebetween, having the end portion 45 at its outer end, and a ring 46 at its inner end, which ring 46 serves as a spacer to retain the sleeve portions 42 and 43 in radial spaced relation, but primarily as the closure means for the opening to space 44. The end 45 may be formed, by doubling the end of the sleeve back on itself, or a spacer ring (not illustrated) or other means may be used to space the elements 42 and 43 at the outer end of the sleeve. The ring 46 may be retained in place by any convenient means such as welding or press-fitting, but preferably is leakproof to exclude liquid from space 44. Otherwise, the construction of FIG. 4 is the same as that of FIG. 2 and the other seal elements remain the same.

In summarizing the construction and operation of the seal arrangement, a description of the operation will be equally applicable to all figures.

The seal assembly is mounted concentric with shaft 14 outside the stuffing box 12 and preferably extends outwardly from seal flange 15 into the atmosphere. Hot water or other liquid from the pump stuffing box 12, enters the flow-path 33 between the insulated sleeve 31 (39 or 41, as the case may be) and shaft 14, is leaked past the end of the sleeve through opening 35 and into the chamber 34 of which the bellows forms a part, at the end of the chamber most remote from the seal faces.

The liquid in the chamber 34 of the rapidly rotating bellows 26, gives up a large portion of its heat to the bellows, which radiates the heat to the outside, where it is dissipated in the atmosphere. The scoop 37 deflects air currents against the outside of said bellows 26 and thus promotes the rapid cooling of the liquid entering the bellows 34 from the pump chamber, and the liquid, with heat dissipated to a large extent, and tempered by the pre-cooled liquid in chamber 34, flows through the bellows and flange ring 25 and across the faces 22 and 24 of the ring seals 21 and 23 respectively, thus lubricating and cooling said faces, and then is dissipated to atmosphere. It is to be observed, that only minute quantities of liquid—in the ordinary seal a few drops an hour during operation—is thus dissipated, and most of the liquid in the chamber 34 is subjected to lengthy cooling during its passage through the bellows 26, and before it reaches the seal faces.

By provision of the insulated sleeve (31, 39, or 41, as the case may be) which prevents heat from the liquid reaching the seals before the liquid has been subjected to cooling in the chamber 34, the pump liquid from the stuffing box may be used as a lubricant for the seal faces. It is noted, that the insulated sleeve preferably is thicker in cross-section in the area beneath the fixed or non-rotating seal ring, to provide additional insulation between the heated fluid in the flow-path 33 and the seal ring. Thus, the hot fluid can be conducted past the seal ring and chamber without heat in any considerable amount reaching the seal faces, such excess heat being dissipated in the chamber 34 before the fluid reaches the seal faces.

One further factor enters into heat dissipation from the fluid. The shaft 14, as it extends outwardly from the stuffing box 12 gradually becomes cooler. The fluid flowing through the flow-path 33, will transfer some of its heat to the shaft 14 by contact therewith before the fluid reaches the chamber 34. Thus as the fluid approaches the opening to the chamber 34, it will be cooler than when it first entered the flow-path 33 as it left the stuffing box.

In referring herein to "hot water" or a "hot liquid" or fluid, the temperature of the liquid in the stuffing box may be considered as at a temperature up to or greater than an amount which would cause it to vaporize or "boil" in atmosphere.

Experimentally, a shaft seal for a hot water pump constructed in accordance with the present invention has been successfully tested and operated with the water in the stuffing box at approximately 240° F. Thus, since water boils at 212° F. at sea level, the cooling effect of the seal chamber on the water will reduce the temperature of the water flowing across the seal faces to below 212° F., so that even with the friction heat generated at the seal, the water does not vaporize before it is discharged to atmosphere from the seal faces where it has performed its lubricating and cooling function. As noted above, the seal operates satisfactorily at approximately 240° F. as the temperature of the water in the stuffing box.

It will be apparent that various modifications may be made in the exemplary embodiments shown and described herein without departing from the spirit and scope of the following claims.

What is claimed is:

1. A mechanical seal arrangement for a vessel for hot liquid, which vessel has an opening therein through which extends a rotatable shaft, wherein the hot liquid serves to lubricate and cool the seal, comprising:
   (A) a mechanical seal of the bellows type around said shaft and outside said vessel, said seal having relatively rotating seal faces;
   (B) means insulating said seal from said vessel and the hot liquid therein, including an insulating sleeve between said shaft and said seal, said insulating means and said seal forming a heat dissipating chamber for liquid from said vessel; and
   (C) means comprising a flow-path for liquid from said vessel between said sleeve and said shaft and into said chamber, whereby liquid from said vessel serves to lubricate said seal faces and is subjected to the dissipation of heat from said liquid in said chamber before it lubricates said seal faces.

2. A mechanical seal arrangement for a vessel for hot liquid, which vessel has an opening therein through which extends a rotatable shaft, wherein the hot liquid serves to lubricate and cool the seal, comprising:
   (A) a mechanical seal of the bellows type around said shaft and outside said vessel, said seal having relatively rotating seal faces;
   (B) means insulating said seal from said vessel and the hot liquid therein, including an insulating sleeve between said shaft and said seal, said insulating means and said seal forming a heat dissipating chamber for liquid from said vessel;
   (C) means comprising a flow-path for liquid from said vessel between said sleeve and said shaft and into said chamber, whereby liquid from said vessel serves to lubricate said seal faces and is subjected to the dissipation of heat from said liquid in said chamber before it lubricates said seal faces; and
   (D) an air scoop located outside said chamber and directing cooling air against said chamber.

3. A device as claimed in claim 1 wherein said insulating sleeve is formed of one of the materials, nylon, Teflon, or Zytel.

4. A device as claimed in claim 1 wherein said insulating sleeve comprises a series of concentric sleeves one within the other, providing a structure of cross-sectional laminated arrangement.

5. A device as claimed in claim 1 wherein said insulating sleeve comprises two concentric sleeve portions spaced apart radially with the space between said sleeve portions sealed at each end thereof.

6. In a pressure vessel having a stuffing box containing a hot liquid and an opening therefrom through which extends a rotatable shaft, means for sealing the said opening against loss of liquid from said vessel comprising:
   (A) a bellows type mechanical seal, adapted to be cooled and lubricated by the liquid from said vessel, mounted in liquid-tight closing engagement with said opening concentric with and radially spaced from said shaft and positioned exteriorly of said vessel, said seal having:
      (a) a non-rotatable seal ring insulated from heat from said vessel,
      (b) a rotatable seal ring mating with said non-rotatable seal ring with relatively rotatable seal faces therebetween,
      (c) a bellows affixed to said rotatable seal ring, such bellows being composed of material having a high heat transfer rate such as beryllium-copper,
      (d) and an adaptor affixed to said bellows and said shaft whereby rotation of said shaft causes rotation of said adaptor, bellows and rotatable seal ring as a unit; and
   (B) a sleeve of heat insulating material, between said seal and said shaft and spaced from the latter to provide a liquid flow-path between the sleeve and the shaft, said flow-path being open to the entry of liquid from said vessel, and said sleeve extending from said vessel to a position adjacent said adaptor but with an opening adjacent said adaptor for liquid to flow from the flow-path to the interior of said seal adjacent the adaptor and remote from said seal ring faces, said sleeve and seal forming a cooling chamber for liquid therebetween, the arrangement being such that liquid from the pressure vessel flows through said flow-path between said insulating sleeve and said shaft into said chamber at a location remote from said seal faces, through said chamber where it is subjected to cooling by heat radiating therefrom through said bellows before said liquid reaches said seal faces where it passes across said faces and lubricates them, after which said liquid is dissipated to atmosphere.

7. In a pressure vessel having a stuffing box containing a heated liquid and an opening therefrom through which extends a rotatable shaft, means for sealing the said opening against loss of liquid from said vessel comprising:
   (A) a bellows type mechanical seal, adapted to be cooled and lubricated by the liquid from said vessel, mounted in liquid-tight closing engagement with said opening concentric with and radially spaced from said shaft and positioned exteriorly of said vessel, said seal having:
      (a) a non-rotatable seal ring insulated from heat from said vessel,
      (b) a rotatable seal ring mating with said non-rotatable seal ring with relatively rotatable seal faces therebetween, (c) a bellows affixed to said rotatable seal ring, such bellows being composed of material having a high heat transfer rate such as beryllium-copper, (d) and an adaptor affixed to said bellows and said shaft whereby rotation of said shaft causes rotation of said adaptor, bellows and rotatable seal ring as a unit;

(B) a sleeve of heat insulating material, between said seal and said shaft and spaced from the latter to provide a liquid flow-path between the sleeve and the shaft, said flow-path being open to the entry of liquid from said vessel and said sleeve extending from said vessel to a position adjacent said adaptor but with an opening adjacent said adaptor for liquid to flow from the flow-path to the interior of said seal adjacent the adaptor and remote from said seal ring faces, said sleeve and seal comprising a cooling chamber for liquid therebetween, the arrangement being such that liquid from the pressure vessel flows through said flow-path between said insulating sleeve and said shaft past the outer end of said sleeve into said chamber at a location remote from said seal faces, through said chamber where it is subjected to cooling by heat radiating through said bellows before said liquid reaches said seal faces where it passes between said faces and lubricates them, after which said liquid is dissipated to atmosphere; and (C) an air scoop mounted exteriorly of said seal to deflect air against the exterior of said bellows for cooling the latter.

8. In a hot liquid pump having a housing and a stuffing box therein containing hot liquid and having an opening through said housing with a rotatable shaft extending therethrough, a method and means of sealing said opening around said shaft to prevent loss of hot liquid therethrough and lubricating the sealing means with liquid from said stuffing box, comprising:

(A) a seal flange having an opening therethrough surrounding said shaft and attached to said housing around said housing opening in sealing relation with said housing;

(B) a mechanical seal of the bellows type wherein the bellows is of heat conducting material, mounted on said flange and surrounding said shaft and extending outwardly from said housing into atmosphere, said seal having:

(a) a non-rotatable seal ring with a seal face, mounted on said seal flange and spaced from said stuffing box, (b) a rotatable seal ring having a seal face complementary to and mating with said seal face of said non-rotating seal ring, said rotatable seal ring being attached to said bellows, and (c) means comprising an adaptor attaching said bellows to said shaft, said attaching means being liquid-tight with respect to said shaft, and said bellows whereby said rotatable seal ring, said bellows said attaching means and said shaft rotate as a unit and liquid is prevented from leaking between said attaching means and said shaft; and (C) a heat insulating sleeve through said flange extending outwardly to adjacent to, but spaced axially from, said attaching means, said sleeve being located between said seal and said shaft and spaced radially from said shaft to provide a liquid flow-path between said sleeve and said shaft, said sleeve, and the said mechanical seal parts comprising the non-rotatable seal ring, the rotatable seal ring, the bellows and attaching means, forming in effect a fluid chamber, open at its outer end adjacent said attaching means and remote from said seal rings to liquid from said flow-path and said flow-path being open at its inner end to liquid from the stuffing box, the arrangement being such that hot liquid from the stuffing box flows through said flow-path into the end of said chamber remote from said seal faces, is diffused with liquid in said chamber and heat therefrom dispersed through said bellows thereby cooling said liquid, said cooled liquid then flowing across said seal faces to lubricate and cool the latter.

9. A device as claimed in claim 7 wherein said insulated sleeve is thickened radially at the inner end thereof and engages said non-rotating seal ring on the inner diameter thereof at the portion thereof nearest the stuffing box, said thickened portion of said sleeve extending axially outwardly in engagement with said non-rotating seal ring for a distance less than the axial width of said seal ring, whereby cooling fluid in said chamber extends under the outer portion of said ring.

10. In a pump for hot liquids such as hot water, which pump has a stuffing box containing hot liquid under pressure and a housing with an opening therein through which extends a rotatable shaft, said opening being surrounded by a housing end flange, a self-cooling sealing means adapted to be lubricated by liquid from the stuffing box, comprising in combination:

(A) a seal flange mounted on said end flange in liquid-tight relation thereto and having a spigot extending into the opening from said pump housing, said end flange and spigot surrounding said shaft and spaced therefrom;

(B) an annular enlargement in the inner diameter of the end flange into which is mounted a nonrotatable seal ring of poor heat conducting material, having a seal face on the outer side thereof;

(C) a flanged insulating sleeve mounted on said seal flange and extending through said seal ring outwardly from said stuffing box, the flange of said insulating sleeve engaging the inner diameter of said seal flange and extending radially between said non-rotatable seal ring and said stuffing box whereby the flange spigot of said insulating sleeve and the seal flange form a heat barrier which insulates said non-rotatable seal ring from the heated liquid of said stuffing box, said insulating sleeve surrounding said shaft and being radially spaced therefrom to form a liquid flow-path;

(D) a rotatable seal ring having a seal face complementary to and mating with the seal face of said non-rotatable seal ring, surrounding said sleeve and spaced therefrom;

(E) a seal cup into which said rotatable seal ring is mounted, said seal cup likewise surrounding said sleeve and spaced therefrom;

(F) a metal bellows of good heat conducting material, attached to said seal cup and surrounding said sleeve and spaced therefrom; and (G) an adaptor attached to said bellows and forming with said bellows, seal cup, rotatable seal ring, and non-rotatable seal ring, the outer and end walls of a liquid chamber and said sleeve forming the inner wall of said liquid chamber, said adaptor being spaced from the end of said sleeve whereby liquid from said stuffing box flowing through said flow-path between said sleeve and said shaft is diverted at the end of said sleeve into said chamber, through said bellows, seal cup, and rotatable seal ring to said seal faces, said adaptor also being attached to said shaft in liquid-tight relation thereto, the arrangement being such that said liquid flowing between said shaft and said sleeve is insulated from said seal ring and said bellows, and is dispersed into said chamber where the heat therefrom is radiated through said bellows into atmosphere, thus cooling said liquid prior to its reaching and lubricating said seal faces.

11. In a pump for hot liquids such as hot water, which pump has a stuffing box containing hot liquid under pressure and a housing with an opening therein through which extends a rotatable shaft, said opening being surrounded by a housing end flange, a self-cooling sealing means adapted to be lubricated by liquid from the stuffing box, comprising in combination:

(A) a seal flange mounted on said end flange in liquid-tight relation thereto and having a spigot extending into the opening from said pump housing, said end flange and spigot surrounding said shaft and spaced therefrom;

(B) an annular enlargement in the inner diameter of the end flange into which is mounted a non-rotatable seal ring of poor heat conducting material, having a seal face on the outer side thereof;

(C) a flanged insulating sleeve mounted in said seal flange and extending through said seal ring outwardly from said stuffing box, the flange of said insulating sleeve engaging the inner diameter of said seal flange and extending radially between said non-rotatable seal ring and said stuffing box whereby the flange spigot of said insulating sleeve and the seal flange form a heat barrier which insulates said non-rotatable seal ring from the heated liquid of said stuffing box, said insulating sleeve surrounding said shaft and being radially spaced therefrom to form a liquid flow-path;

(D) a rotatable seal ring having a seal face complementary to and mating with the seal face of said non-rotatable seal ring, surrounding said sleeve and spaced therefrom;

(E) a seal cup into which said rotatable seal ring is mounted, said seal cup likewise surrounding said sleeve and spaced therefrom;

(F) a metal bellows of good heat conducting material, attached to said seal cup and surrounding said sleeve and spaced therefrom;

(G) an adaptor attached to said bellows and forming with said bellows, seal cup, rotatable seal ring, and non-rotatable seal ring, the outer and end walls of a liquid chamber and said sleeve forming the inner wall of said liquid chamber, said adaptor being spaced from the end of said sleeve whereby liquid from said stuffing box flowing through said flow-path between said sleeve and said shaft is diverted at the end of said sleeve into said chamber, through said bellows, seal cup, and rotatable seal ring to said seal faces, said adaptor also being attached to said shaft in liquid-tight relation thereto, the arrangement being such that said liquid flowing between said shaft and said sleeve is insulated from said seal ring and said bellows, and is dispersed into said chamber where the heat therefrom is radiated through said bellows into atmosphere, thus cooling said liquid prior to its reaching and lubricating said seal faces; and (H) an air scoop mounted on said seal flange and extending outwardly over said bellows to deflect air against the outer surface of said bellows, thus enhancing the heat dissipation from said bellows.

References Cited

UNITED STATES PATENTS

| | | | |
|---|---|---|---|
| 1,876,520 | 9/1932 | Newkirk et al. | 277—22 |
| 2,577,292 | 12/1951 | Weber | 277—22 X |
| 2,747,901 | 5/1956 | Clavell | 277—88 X |
| 3,031,197 | 4/1962 | Wilkinson | 277—16 |

FOREIGN PATENTS

| | | |
|---|---|---|
| 1,438,913 | 4/1966 | France. |

SAMUEL ROTHBERG, *Primary Examiner.*

U.S. Cl. X.R.

277—68, 89